US007021043B2

(12) United States Patent
Lee

(10) Patent No.: US 7,021,043 B2
(45) Date of Patent: Apr. 4, 2006

(54) JET ENGINE USING EXHAUST GAS

(76) Inventor: Jae-Chang Lee, 2-1311 Samsung 1 cha Apt., 810-3 Maetan4-dong, Paldal-gu, Suwon-si, Kyunggi-do (KR) 442-374

( * ) Notice: Subject to any disclaimer, the term of this patent is extended or adjusted under 35 U.S.C. 154(b) by 38 days.

(21) Appl. No.: 10/758,928

(22) Filed: Jan. 16, 2004

(65) Prior Publication Data

US 2004/0159108 A1 Aug. 19, 2004

Related U.S. Application Data

(63) Continuation-in-part of application No. PCT/KR02/01340, filed on Jul. 16, 2002.

(30) Foreign Application Priority Data

Jul. 18, 2001 (KR) ...................... 10-2001-0043177
Apr. 25, 2002 (KR) ...................... 10-2002-0022772

(51) Int. Cl.
*F02K 3/02* (2006.01)

(52) U.S. Cl. ........................ 60/226.1; 60/804; 60/39.41

(58) Field of Classification Search ............... 60/39.41, 60/226.1, 262, 263, 269, 804
See application file for complete search history.

(56) References Cited

U.S. PATENT DOCUMENTS 3,369,361 A * 2/1968 Craig .......................... 60/39.5
3,374,630 A * 3/1968 Davison et al. ............ 60/226.1
4,569,199 A * 2/1986 Klees et al. ............... 60/226.1
4,631,914 A * 12/1986 Hines .......................... 60/775
4,772,179 A 9/1988 Bennett et al.
6,378,293 B1 * 4/2002 Care et al. ................. 60/226.1
6,532,731 B1 * 3/2003 Springer .................... 60/226.1
6,553,765 B1 * 4/2003 Bregentzer .................... 60/723
6,584,778 B1 * 7/2003 Griffiths et al. ............... 60/782
2002/0026787 A1 * 3/2002 Bregentzer ................. 60/226.1
2002/0134070 A1 * 9/2002 Orlando et al. ............... 60/204
2003/0070418 A1 * 4/2003 Eiler et al. ..................... 60/262
2003/0177769 A1 * 9/2003 Graves et al. ................ 60/752
2005/0229586 A1 * 10/2005 Whurr ....................... 60/226.1

FOREIGN PATENT DOCUMENTS

DE 4121995 1/1992
DE 4129357 8/1992
JP 3-222829 10/1991
JP 3-233140 10/1991
WO PCT/KR02/01340 1/2003

OTHER PUBLICATIONS

International Search Report PCT/KR02/01340.

* cited by examiner

*Primary Examiner*—William H. Rodriguez
(74) *Attorney, Agent, or Firm*—Welsh & Katz, Ltd.

(57) ABSTRACT

A jet engine using exhaust gas to get the propulsive force by rotating a fan within the exhaust gas burned in and emitted from the engine includes a body, a burner installed to the body to inject and burn the fuel in compressed air, a high-pressure turbine for giving rotational force by high-pressure exhaust gas from the burner, a low-pressure turbine for giving rotational force by low-pressure exhaust from the high-pressure turbine, a rotary shaft combined to a rotational center of the high-pressure and low-pressure turbines, and a propulsive force providing unit which is rotating together with the rotary shaft to change component of lateral velocity of the exhaust gas emitted through the turbines from the burner to be directed rearward.

5 Claims, 6 Drawing Sheets

JET ENGINE USING EXHAUST GAS

This is a CIP of PCK/KR02/01340 filed on Jul. 16, 2002.

TECHNICAL FIELD

The present invention relates to a jet engine such as a turbo engine, and more particularly to a jet engine using exhaust gas which obtains propulsive force by rotating a fan within exhaust gas burned and discharged in the engine.

BACKGROUND ART

Generally, a jet-propelled engine means a heat engine which ejects high temperature gas burned in the engine and then uses its repulsive force to advance. This jet-propelled engine is commonly called 'jet engine', and may include a rocket engine having oxygen source necessary for combustion in a broad sense.

The jet engine is mostly used as a prime mover of an airplane, and classified into four types depending on its structure and function.

Firstly, there is a Turbojet, which compresses air inhaled from the atmosphere with an axial-flow type or centrifugal-flow type compressor, draws this compressed air into a burner so that fuels injected into the burner are burned, and then discharges high-temperature and high-pressure combustion gas toward a compression-driving turbine. That is, Turbojet is a prime mover which obtains propulsive force by jetting the gas, which has passed through the turbine, through jet nozzles.

This engine receives a great deal of air so as to control the temperature of combustion gas lower than a certain point in aspect of heat resistance of the turbine material, and thus there remains a lot of oxygen among the combustion gas. Therefore, in order to increase propulsive force, some turbojet engines are equipped with a long tail pipe and inject secondary fuel into the pipe for the purpose of after-burning.

Next, there is Turboprop which is a jet-propelled engine having a structure that a propeller is attached to the turbojet. Turboprop has similar configuration to the turbojet. But, energy of combustion gas in Turboprop is mostly converted into driving force of the propeller. Thus, Turboprop uses propulsive force of the propeller and jetting force together. Turboprop has performance between a propeller and a turbojet, and is suitable for an engine of a passenger airplane or a transport plane not requiring a high-speed flight.

There is also Bypass Jet which has an axial compressor instead of the propeller of turboprop. Bypass Jet ejects a part of compressed air through outer circumference of the combustion chamber together with combustion gas. This does not need a reduction gear, which is a factor of demerit of the turboprop. Bypass Jet also consumes very small fuel and is suitable for relatively fast transport planes.

As another type of jet-propelled engines, there is Ram Jet. If flying speed increases, atmosphere air is relatively flowed into the engine and then compressed due to its inertia. This is called "Ram effect", and Ram Jet introduces the compressed air into the combustion chamber by using this Ram effect and then injects fuel thereto. Ram Jet ejects combustion gas through jet nozzles and then uses its repulsive force to advance.

In fact, Ram Jet is equipped with a diffuser to help inflow air to move slowly. Slowly moving air increases pressure in the diffuser, and thus the air is easily compressed to very high pressure. This engine has very simple structure and its performance is better as the plane moves faster. Thus, Ram Jet is suitable for a prime mover of a supersonic airliner moving at two or three times the speed of sound.

However, to obtain motive power, high-speed air is applied to Ram Jet from outside. Thus, there is designed a hybrid engine called "Turbo Ram Jet" which operates as a turbojet at a low speed and as a ramjet at a high speed.

As another type of jet-propelled engines, there is Pulse Jet. Pulse Jet has an automatic valve at the front of air inhalator. When a plane is flying, atmosphere air pushes the automatic valve to be opened and enters the diffuser. The air entering the diffuser loses its speed and makes the pressure in the combustion chamber increased. Then, the fuel is injected and burned, which makes the pressure in the combustion chamber more increased. This makes the automatic valve is closed. The combustion gas is ejected through jet nozzles to give propulsive force. If the combustion gas is ejected, the pressure in the combustion chamber is decreased and then air can be flowed in the combustion gas through the automatic valve.

This Pulse Jet has a feature that combustion is intermittently generated, compared with other engines in which combustion is continuously generated. Pulse Jet has simple structure, but it has disadvantages such as large fuel consumption and short lifecycle.

In such a jet engine, most needed is reliability. When evaluating its performance, there are considered three main factors: the propulsive force of engine should be great, compared with its weight; the propulsive force should be great, compared with its front surface area; and the fuel consumption should be low.

However, three conditions are rarely satisfied. Particularly, the turbojet generates serious noise and consumes too much fuel, so not frequently used in these days. The ramjet primarily used in high-speed airplanes has an advantage that it has simple configuration and gives great propulsive force, compared with its front surface area, but it consumes too much fuel.

In addition, the turbofan and the turboprop lower its fuel consumption rate by converting the energy generated in its basic turbojet engine into rotary energy of fan or propeller installed at the front. However, the turbofan and the turboprop disadvantageously give not to great propulsive force, compared its front surface area, since the fan or the propeller rotates among atmosphere air having low density. It is because there are generated many losses in the forwarding propulsive force when the fan or the propeller rotates among the low-density atmosphere air.

Furthermore, since giving the propulsive force toward the atmosphere air straightly flowing from the front, the turbofan and the turboprop demonstrate its function only at or below supersonic speed. At a speed above the supersonic speed, the fan or the propeller does not push the rushing atmosphere but disturb the flow of atmosphere air.

In addition, the fan and the propeller used in the turbofan and the turboprop have relatively big diameter, so the engine becomes bigger and heavier. In addition, its big size becomes an obstruction to its advancing due to friction with the atmosphere, and its weight also works as a burden of the engine itself.

Therefore, there still remains a need for a jet engine having small weight, great propulsive force to a front surface area and low fuel consumption rate.

DISCLOSURE OF INVENTION

The present invention is designed to solve such problems of the prior art, and an object of the invention is to provide a jet engine using exhaust gas, which may obtain greater propulsive force through simple structural change that rotates a fan among exhaust gas having high density.

In order to accomplish the above object, the present invention provides a jet engine which includes a body; a burner installed in the body to inject and burn fuel in compressed air; a high-pressure turbine having a plurality of rotors, the high-pressure turbine being rotated by high-pressure exhaust gas discharged from the burner; a low-pressure turbine having a plurality of rotors, the low-temperature turbine being rotated by low-pressure exhaust gas passing through the high-pressure turbine; a rotary shaft combined to gyratory centers of the high-pressure turbine and the low-pressure turbine; and a propulsive force providing unit which rotates together with the rotary shaft in order to change lateral component of velocity of the exhaust gas, discharged through the low-pressure turbine from the burner, to be directed rearward.

Preferably, the propulsive force providing unit is a fan combined to the rotary shaft at the rear of a last rotor of the low-pressure turbine, and the fan is substantially parallel to a tail portion of the last rotor of the low-pressure turbine at a head portion thereof and curved rearward at a tail portion thereof in order to change the lateral component of velocity of the exhaust gas, passing through the low-pressure turbine, to be directed rearward to the utmost when rotating.

As another embodiment, the propulsive force providing may be a bent portion formed in a tail of each rotor of the low-pressure turbine, and the bent portion of each rotor changes the lateral component of velocity of the exhaust gas, passing through the near rotor, to be directed rearward to the utmost so as to provide propulsive force.

Preferably, the bent portion is formed in all rotors of the low-pressure turbine except a last rotor, a fan combined to the rotary shaft to rotate together with the rotary shaft is installed at the rear of the last rotor, and the fan is substantially parallel to a tail portion of the last rotor of the low-pressure turbine at a head portion thereof and curved rearward at a tail portion thereof in order to change the lateral component of velocity of the exhaust gas, passing through the low-pressure turbine, to be directed rearward to the utmost when rotating.

As still another embodiment, the propulsive force providing means also may be first and second tails formed in each rotor of the low-pressure turbine, and the first tail is formed substantially straightly so that gas flowing on a surface thereof is directed toward an adjacent rotor, while the second tail is bent rearward so that the lateral component of velocity of the exhaust gas, advancing from another adjacent rotor, is directed rearward to the utmost so as to provide propulsive force.

At this time, it is preferred that the first and second tails are formed in all rotors of the low-pressure turbine except a last rotor, a fan combined to the rotary shaft to rotate together with the rotary shaft is installed at the rear of the last rotor, and the fan is substantially parallel to a tail portion of the last rotor of the low-pressure turbine at a head portion thereof and curved rearward at a tail portion thereof in order to change the lateral component of velocity of the exhaust gas, passing through the low-pressure turbine, to be directed rearward to the utmost when rotating.

As further another embodiment, the propulsive force providing may be a transformed tail formed in each rotor of the low-pressure turbine, and the transformed tail has a first surface formed substantially straightly so that gas flowing on a surface thereof is directed toward an adjacent rotor, and a second surface bent rearward so that the lateral component of velocity of the exhaust gas, advancing from another adjacent rotor, is directed rearward to the utmost so as to provide propulsive force.

Preferably, the transformed tail is formed in all rotors of the low-pressure turbine except a last rotor, a fan combined to the rotary shaft to rotate together with the rotary shaft is installed at the rear of the last rotor, and the fan is substantially parallel to a tail portion of the last rotor of the low-pressure turbine at a head portion thereof and curved rearward at a tail portion thereof in order to change the lateral component of velocity of the exhaust gas, passing through the low-pressure turbine, to be directed rearward to the utmost when rotating.

In addition, the fan preferably has a diameter substantially similar to a diameter of the last rotor of the low-pressure turbine.

Preferably, the jet engine of the present invention can be realized in various types: a turbojet type in which a compressor is installed in the body, the compressor being connected to the rotary shaft and rotating by the rotating force of the turbine to compress air supplied into the burner; a ramjet type in which a compressing chamber is installed at the front of the body so as to naturally compress air which is flowed therein when the body advances; and a rocket type in which a front portion of the body is sealed, and an oxygen storage area is prepared in the body in order to store oxygen to be supplied to the burner.

The jet engines of various types can be equipped with a cooling device, and this cooling device cools the fan by using air compressed in the diffuser or other coolant. At this time, the cooling device can be designed to cool the turbine and the stators together with the fan, and particularly the cooling device may cool even bearings used in the turbine.

BRIEF DESCRIPTION OF THE DRAWINGS

These and other features, aspects, and advantages of preferred embodiments of the present invention will be more fully described in the following detailed description, taken accompanying drawings. In the drawings.

BEST MODES FOR CARRYING OUT THE INVENTION

Hereinafter, preferred embodiments of the present invention will be described in detail with reference to the accompanying drawings. First, a jet-propelled engine, commonly called 'jet engine', means a heat engine which ejects high temperature gas burned in the engine through jet nozzles and then uses its repulsive force to advance, and it should be understood that principle and features of the present invention described later could be applied to various heat engines such as turbojet, turbofan, turboprop, ramjet, pulsejet and rocket.

Figure 1:
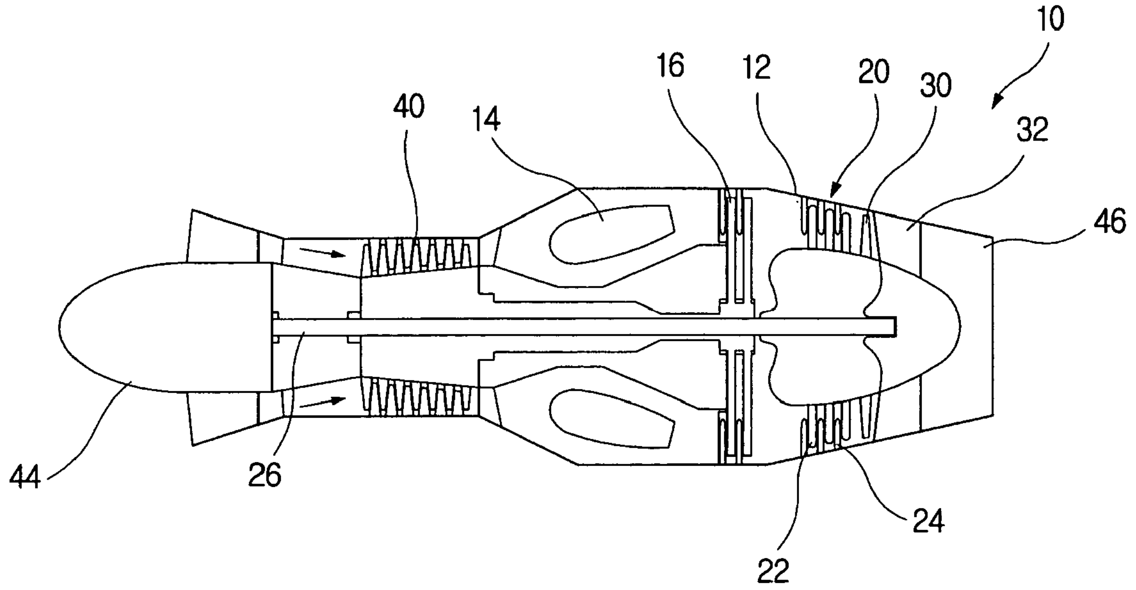
FIG. 1 is a sectional view showing a jet-propelled engine according to the present invention.

FIG. 1 is a sectional view showing configuration of the jet-propelled engine according to the first embodiment of the present invention. The first embodiment of the present invention adopts a turbojet engine, which is the most ordinary type, in a modified shape according to the principle of the present invention.

Referring to FIG. 1, the jet engine 10 of the present invention has a body 12 constituting an overall outward shape. The shape of the body 12 can be modified depending on the kind of engine and required parts, and the body 12 approximately has a cylindrical shape which inhales air at the front and discharges exhaust gas at the rear.

A burner 14 is installed in the body 12. The burner 14 gives a space for mixing fuel with compressed air and burning them. In addition, after burning the air and fuel in the burner 14, exhaust gas of high temperature and high pressure is discharged rearward.

At this time, if the jet engine is a turbojet engine as in this embodiment, there is installed a compressor 40 for compressing the atmosphere flowed in the burner 14. The compressor 40 includes a plurality of rotors and stators, and rotates by means of driving force of a turbine 16, described later. This compressor 40 is used in an engine for low-speed flying, and not used in a ramjet engine for high-speed flying.

A nose cone 44 is mounted at the front of the compressor 40. The nose cone plays a role of lessening resistance of air when the body 12 advances and helping the atmosphere air be flowed into the compressor 40 to the maximum.

At a rear of the burner 14, installed are a high-pressure turbine 16 and a low-pressure turbine 20. Though it is shown that two-stage high-pressure turbine and three-stage low-pressure turbine are used in this embodiment, the kind and the number of turbines can be modified variously, not limited to that case.

The high-pressure and low-pressure turbines 16 and 20 have a plurality of rotors 22 formed on outer circumference of a rotating body thereof, and are rotated at a high speed by means of high-temperature and high-pressure gas discharged from the burner 14. These turbines 16 and 20 convert kinetic energy of the fluid into useful mechanical energy. Rotation energy generated in the high-pressure turbine 16 is transmitted to the above-mentioned compressor 40, and rotation energy generated in the low-pressure turbine 20 is transmitted to a fan 30, described later.

There are mounted stators 24 at the front of each rotor 22 in order to control flow of the gas supplied to each rotor 22 to a direction suitable for angle and shape of each rotor 22. The stators 24 are fixed to an inner circumference of the body 12, and not rotated.

The jet engine constructed as above is equipped with a propulsive force providing means for providing propulsive force in addition to the basic propulsive force obtained by fuel ejection. As an example of the propulsive force providing means, there is mounted a fan 30 at the rear of the turbine 20. The fan 30 is connected to the turbine 20 through the same rotary shaft 26, and rotated by the turbine 20. The fan 30 has a plurality of blades, which are curved in a direction substantially opposite to a bent portion of the last rotor turbine 20. Particularly, each blade of the fan 30 has a head portion substantially parallel to an advancing direction of exhaust gas discharged through the last rotor of the turbine 20 with a lateral component of velocity, but each blade of the fan 30 is gradually curved rearward at its tail. This shape of the fan blade converts a direction of the exhaust gas passing through the last rotor of the turbine 20 with a lateral component of velocity to be directed rearward.

Preferably, the fan 30 is configured to convert a direction of the exhaust gas as closer to an axial direction as possible in order to reduce energy loss and improve efficiency.

A curved shape of the fan 30 and an advancing direction of the gas passing through the turbine 20 and the fan 30 are described in detail with reference to FIG. 2. The stators 24 and the rotors 22 of the turbine 20 are schematically shown in FIG. 2.

Figure 2:
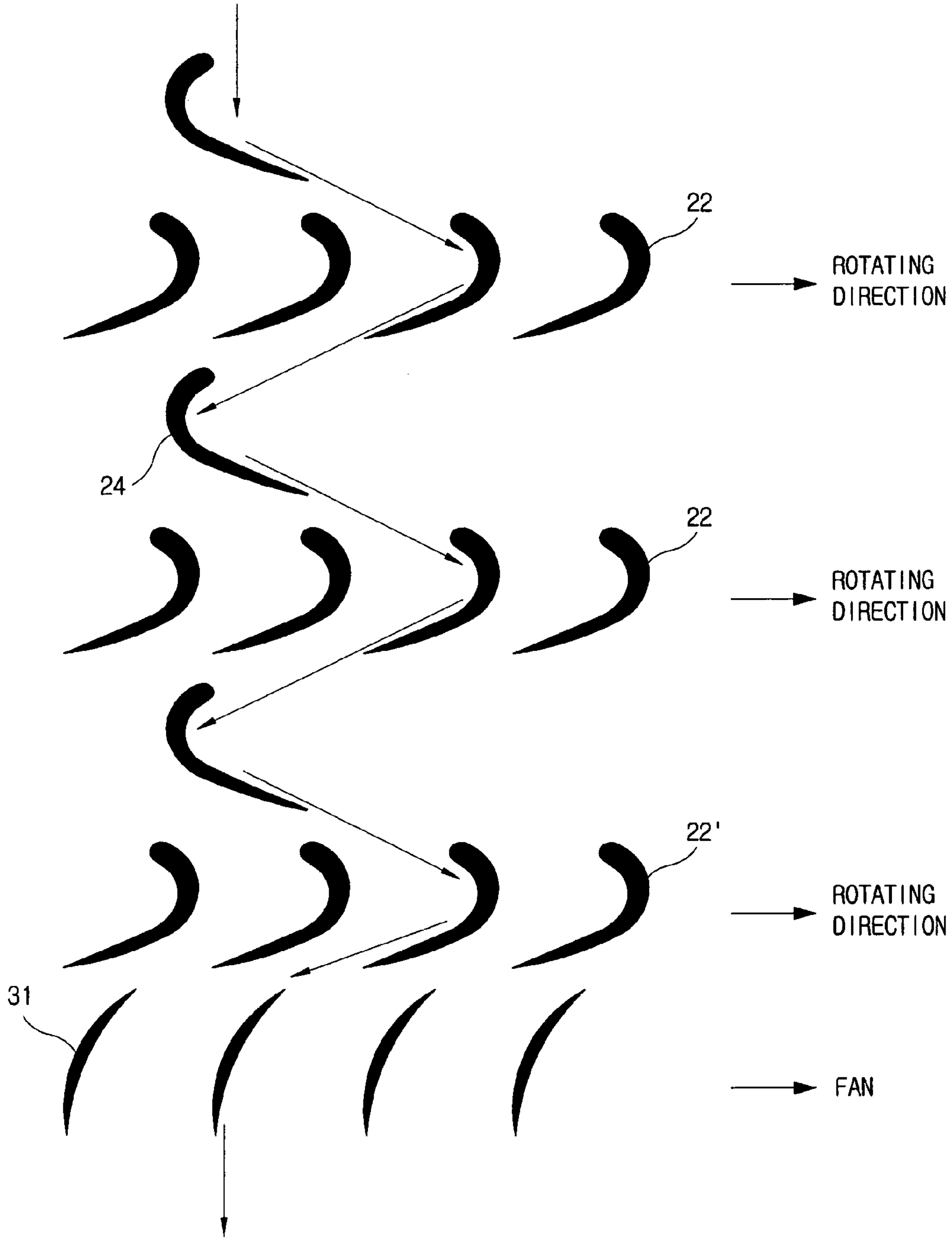
FIG. 2 shows a flow path of exhaust gas passing through a turbine and a fan in the jet-propelled engine of FIG. 1.

Referring to FIG. 2, the exhaust gas is initially flowed to the low-pressure turbine 20 in a straight direction. Generally, the rotor 22 generating a rotation force by the gas is inclined to the gas advancing rearward. The stator 24 also changes an advancing direction of the gas so that the gas moving toward the rotor 22 may be more effectively collided with a surface of the inclined rotor 22.

In other words, the gas passing through the stator 24 is ejected at an angle of about 15° to a horizontal line in the drawing. This gas pushes the rotor 22 and at the same time its advancing direction is bent by means of the bent shape of the rotor 22, so advancing somewhat laterally at about −30~−50°. In the case shown in the figure, this process is repeated through three rotors 22 and two stators 24, and in this process, the gas pushes the rotors 22 and the turbine 20 is rotated.

In addition, the gas passing through the last rotor 22' is flowed toward the blade 31 of the fan 30. At this time, a tail portion of the fan blade 31 is curved rearward, not elongated to the side as in the case of the rotor 22 or the stator 24. Thus, the gas passing through the fan blades 31 are directed toward and ejected through the rear of the engine according to the curved shape of the fan blades31. In other words, though the gas passing through the last rotor 22 contains a significant amount of lateral component of velocity, the lateral component of velocity is changed to be directed rearward as the gas passes through the fan blades 31.

A head portion of the fan blade 31 is substantially parallel to a tail portion of the last rotor 22', and other portion of the fan blade 31 is gradually curved rearward. Thus, when flowing into the fan blades 31, the gas passing through the last rotor 22' does not produce friction with the fan blades 31. However, when this gas passes through a tail portion of the fan blade 31, the tail portion of the fan blade 31 pushes the gas rearward since the fan blade 31 rotates in connection with the rotary shaft 26 of the turbine 20 and the tail portion is curved toward the rear of the engine. In other words, kinetic energy of the gas passing through the last rotor 22' is collided with the tail of the fan blades 31, and the fan blades 31 rotates with overcoming resistance of such exhaust gas, so pushing the exhaust gas flowed between the fan blades 31 to be directed rearward at a higher speed. Thus, owing to a repulsive force against the pushed exhaust, the fan blades 31 themselves may generate a great deal of forwarding propulsive force.

The fan 30 mounted at the rear of the low-pressure turbine 20 rotates the blades among the exhaust gas having a higher density than the atmosphere, so it may gives stronger propulsive force. In addition, since the blades 31 of the fan 30 changes a significant part of the velocity component of the gas passing through the turbine 20 to be straightly directed rearward, the exhaust gas passing through the fan 30 may produce a forwarding propulsive force without dissipation of power. Thus, the jet engine of this embodiment may generate a forwarding propulsive force by means of the exhaust gas without loss.

In such an embodiment, it is also preferable to adjust an angle of the rotors 22, particularly the last rotor 22' so that the advancing direction of the exhaust gas passing through the rotors 22 of the low-pressure turbine 20 may have an sufficient influence on the blades 31 of the fan 30. At this time, the angle of the rotor 22 is a factor having a great influence on efficiency and energy loss of the turbine. The angle of the rotor 22 is generally recommended to design so that an advancing direction of the exhaust gas passing through the rotor 22 may be within a range of 0°~15° to an axial direction. In a general case, the exhaust gas passing through the rotor 22 is substantially discharged at approximately near 15° on the basis of the axial direction. Thus, the angle of the fan 30 is also preferably set at its head portion to be approximately in a range of 25°~30° to the axial direction in consideration of the angle of the gas discharged through the rotor 22.

This fan 30 is installed in the body 12, and preferably has a diameter nearly identical to or a bit greater than a diameter of the last rotor 22' of the turbine 20. A conventional large-scaled fan adopted in the turbofan or the turboprop has many disadvantages since it increases a front surface of the jet engine and therefore air friction during flight and it burdens the engine with additional weight. However, in the present embodiment manufactures, the fan 30 has so small diameter to be installed in the body 12, thus the conventional problems can be solved. In addition, since the jet engine of this embodiment does its propulsive action through its exhaust gas, the jet engine can be substituted with an inefficient rocket engine, which can be used in a weightless state such as in space.

In the figure, reference numeral 32 denotes a strut frame, and reference numeral 46 denotes an exhaust nozzle.

Figure 3:
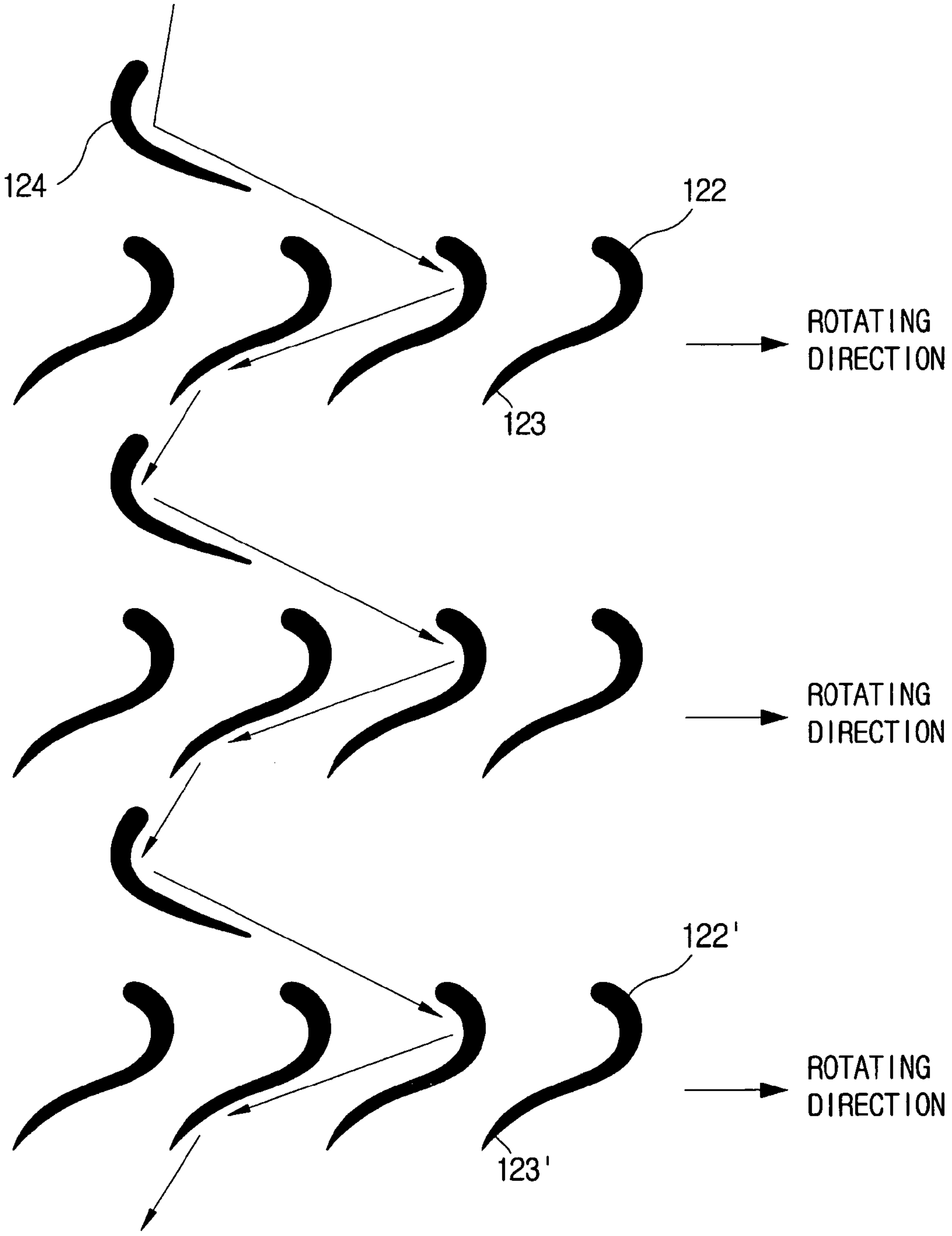
FIG. 3 shows a flow path of exhaust gas passing through a turbine according to another embodiment of the present invention.

As another embodiment, the present invention may employ other manner instead of the above-mentioned fan as a propulsive force providing means for obtaining an additional propulsive force. In this embodiment, a tail portion of each rotor mounted in the turbine 20 is transformed so that each rotor may obtain an additional propulsive force. Arrangement of the rotor is substantially similar to that of FIG. 1, except that the fan 30 of FIG. 1 is omitted and each rotor of the turbine 20 is transformed. The rotors 122 of the turbine 20 are well shown in FIG. 3. Referring to FIG. 3, shape and operating principle of the rotors 122 according to this embodiment are described below.

First, the rotor 122 of the turbine according to this embodiment has a head same as or similar to that of the former embodiment, but a bent portion 123 is elongated rearward at a tail of the rotor 122. In other words, the rotor 122 of this embodiment has the head obliquely inclined and is gradually bent toward an opposite side to form an arc, and then is slightly bent rearward at the bent portion 123 to form a reverse arc.

With such configuration, the gas flowing into the rotor 122 is collided with the head of the rotor 122 so that the rotor 122 is rotated, and then the gas is directed to an opposite side. At this time, the gas contains a significant lateral component of velocity. However, this gas is collided with the bent portion 123 formed in the tail and then rather slightly directed rearward. During this process, the bent portion 123 formed in the tail of the rotor 122 may obtain an additional propulsive force. The bent portion 123 of this embodiment obtains a small propulsive force rather than the fan 30 of the former embodiment. However, since the bent portions can be formed in each rotor formed in multi stages of the turbine, the jet engine of this embodiment may advantageously obtain subsequent propulsive forces at several stages.

The exhaust gas advancing in a changed direction is flowed into the stator 124. At this time, the exhaust gas flowing into the stator 124 has a reduced incidence angle due to the bent portion 123. Thus, energy loss caused by collision between the exhaust gas and the stator 124 can be significantly reduced. Such movements of the gas are repeated during passing through each of the rotors 122 and the stators 124, and ejected outside through the last rotor 122'. In particular, the last rotor 122' also has a bent portion 123' at its tail, so the exhaust gas passing through the last rotor 122' is directed rearward rather than the conventional one. Thus, the last rotor 122' significantly decreases an incident angle of the exhaust gas advancing to the strut frame mounted at the rear, so it may reduce energy loss caused by collision between the exhaust gas and the strut frame.

In this embodiment, it is also preferred to adjust an angle of the rotor 122 so that an advancing direction of the exhaust gas passing through the rotor 122 may have a sufficient effect on the bent portion 123 and 123'. At this time, the angle of the rotor 122 is a factor having a great influence on efficiency and energy loss of the turbine. Theoretically, the angle of the rotor 122 is recommended to be designed so that an advancing direction of the exhaust gas passing through the rotor 122 may be within a range of 0°~15° to an axial direction. In a general case, the exhaust gas passing through the rotor 122 is substantially discharged at approximately near 15° to the axial direction. Thus, the angle of the bent portions 123 and 123' is also preferably set to be approximately straight to the axial direction in consideration of the angle of the rotor 122.

The propulsive force providing means of the above embodiments can be united. In other words, the fan 30 of the former embodiment can be applied to a jet engine together with the bent portion 123 of the later embodiment. In this case, the jet engine may obtain a subsequent propulsive force by means of the rotors and an additional propulsive force by means of the fan at the same time, so the effect of the present invention is maximized. In this case, the last rotor may not have the bent portion in consideration of the fan.

Figure 4:
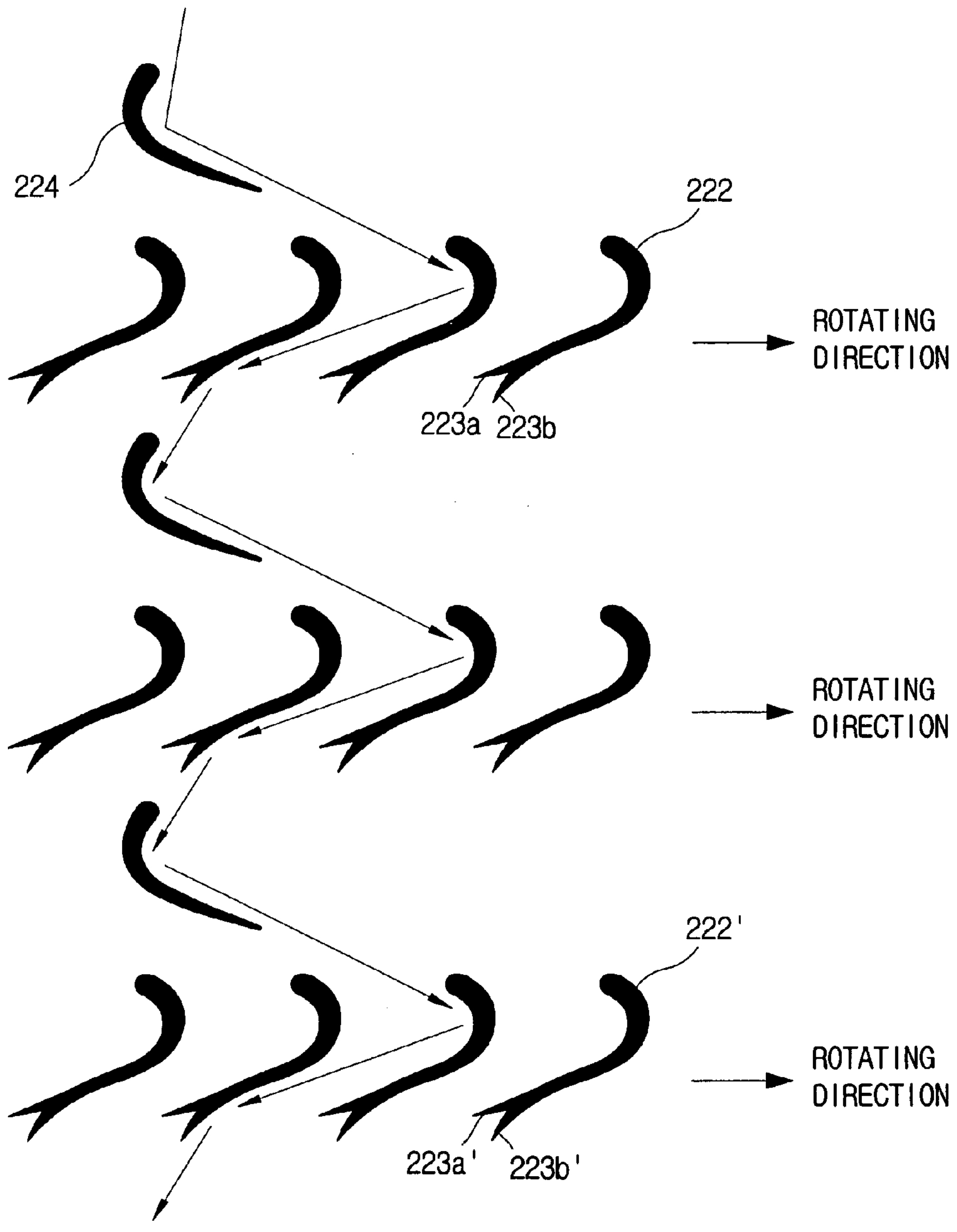
FIG. 4 shows a flow path of exhaust gas passing through a turbine according to another embodiment of the present invention.

FIG. 4 shows a propulsive force providing means for obtaining an additional propulsive force according to a third embodiment. Referring to FIG. 4, this embodiment is similar to the second embodiment in the point that a tail shape of each rotor installed to the turbine 20 is transformed, but different from the second embodiment in its tail shape.

In this embodiment, a head portion of the rotor 222 installed to the turbine 20 is substantially identical or similar to that of the former embodiments, while the rotor 222 has a first tail **223*a* similar to the rotor 22 of the first embodiment and a second tail 223*b* similar to the rotor 122 of the second embodiment. In other words, in the rotor 222 of this embodiment, the first tail 223*a* has no specific curve so that gas flowing on its surface may move toward an adjacent rotor sufficient. On the other hand, the second tail 223*b*** is bent rearward so that it may push the exhaust gas, approaching from another adjacent rotor, rearward and produce additional propulsive force.

At this time, the second tail **223*b* substantially plays the same role as the bent portion 123 of the second embodiment. However, in the present embodiment, since the first tail 223*a* moves the exhaust gas toward a second tail of an adjacent rotor, the second tail 223*b*** may push the exhaust gas stronger and the additional propulsive force is thus more increased.

Such movements of the gas are repeated during passing through each of the rotors 222 and the stators 224, and then ejected outside through the last rotor 222'. In particular, the last rotor 222' also has a second tail 223*b'* bent rearward together with a first tail 223*a'*, so the exhaust gas passing through the last rotor 222' is directed rearward rather than the conventional one. This feature is substantially identical to the second embodiment mentioned above.

In this embodiment, it is described that the rotors are transformed to obtain an additional propulsive force and the fan as mentioned in the first embodiment is not installed. However, such a fan may be installed in this embodiment. If the fan is installed, the last rotor 222' preferably does not have the second tail in consideration of the fan. If the fan is provided together with the second tail 223*b*, the jet engine may obtain a subsequent propulsive force by means of the rotors and an additional propulsive force by means of the fan at the same time, so the effect of the present invention is maximized.

Figure 5:
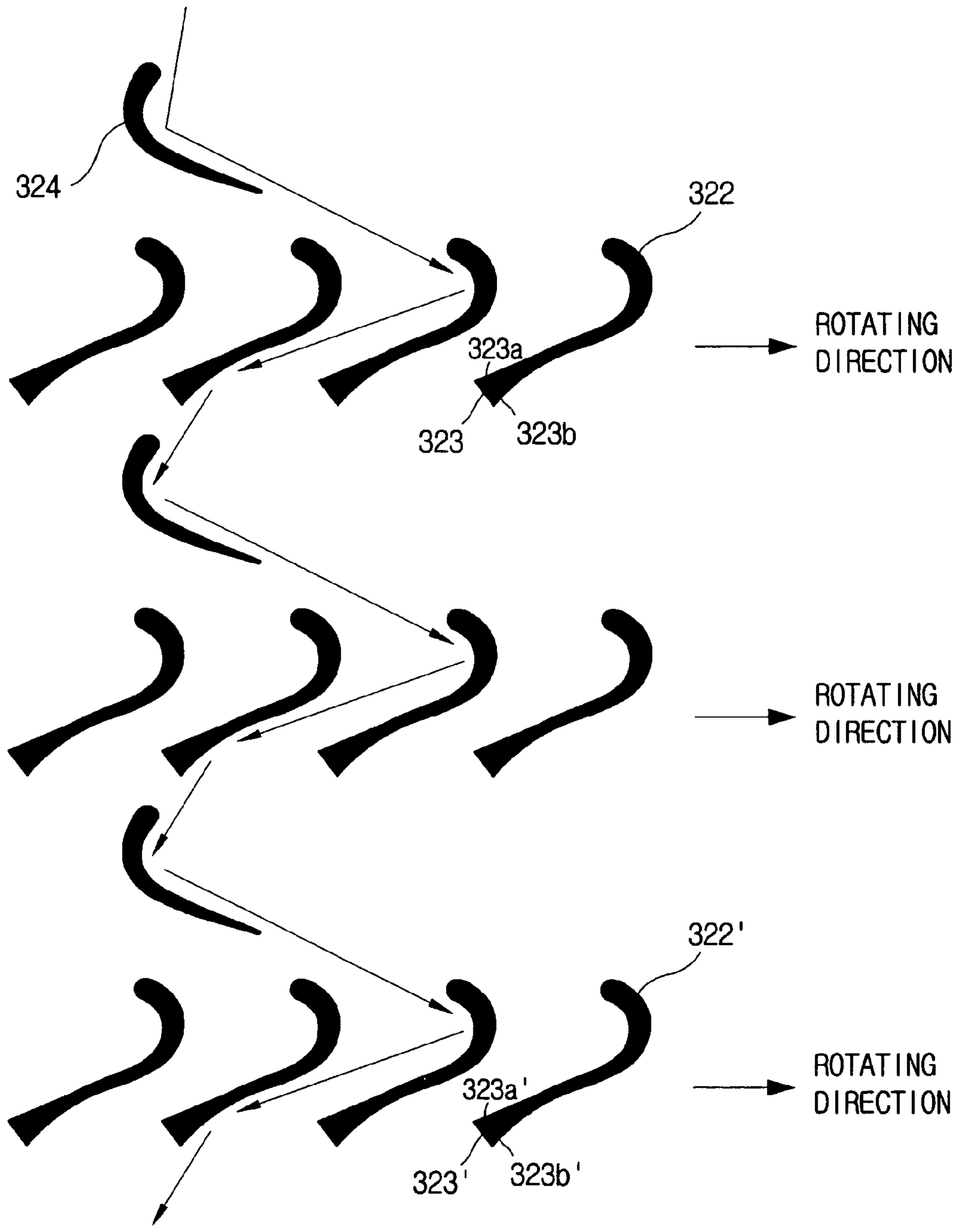
FIG. 5 shows a flow path of exhaust gas passing through a turbine according to another embodiment of the present invention.

FIG. 5 shows a propulsive force providing means for obtaining an additional propulsive force according to a fourth embodiment. This embodiment is substantially identical to the third embodiment. However, a tail portion of the rotor 322 of this embodiment is not split into two parts as mentioned in the third embodiment, but the rotor 322 has one transformed tail 323 which is gradually wider toward its end like the caudal fin.

In this embodiment, the deformed tail 323 of the rotor 322 is configured so that its first surface 323*a* has a surface substantially identical to the surface of the rotor 22 of the first embodiment, and its second surface 323*b* has a surface substantially identical to the surface of the rotor 122 of the second embodiment. In other words, in the rotor 322 of this embodiment, the first surface 323*a* of the deformed tail 323 has no specific curve so that gas flowing on its surface may move toward an adjacent rotor sufficiently. On the while, the second surface 323*b* is bent rearward so that it may push the exhaust gas, approaching from another adjacent rotor, rearward and produce additional propulsive force at the same time.

At this time, the second surface 323*b* substantially plays the same role as the bent portion 123 of the second embodiment and the second tail 223*b* of the third embodiment. However, in the present embodiment, since the first surface 323*a* moves the exhaust gas toward a second surface of an adjacent rotor, the second surface 323*b* may push the exhaust gas stronger and the additional propulsive force is thus more increased.

Such movements of the gas are repeated during passing through each of the rotors 322 and the stators 324, and then ejected outside through the last rotor 322'. In particular, the last rotor 322' also has a second surface 323*b'* bent rearward together with a first surface 323*a'*, so the exhaust gas passing through the last rotor 322' is directed rearward rather than the conventional one. This feature is substantially identical as mentioned in the second and third embodiments.

In this embodiment, it is described that the rotors are transformed to obtain an additional propulsive force and the fan as mentioned in the first embodiment is not installed. However, such a fan may be installed in this embodiment. If the fan is installed, the last rotor 322' preferably has a shape identical to that of the rotor 22 of the first embodiment in consideration of the fan. If the fan is provided together with the second surface 323*b*, the jet engine may obtain a subsequent propulsive force by means of the rotors and an additional propulsive force by means of the fan at the same time, so the effect of the present invention is maximized.

The features of the present invention may be applied to other types of jet engines besides the turbojet engine. As another preferred example, a ramjet and a rocket are taken into consideration. Though it is described below that the fan 30 is applied as the propulsive force providing means, it should be understood that the principle of the present invention can be similarly adopted in the case of the rotors and in the case that the fan and the rotor are applied together.

Figure 6:
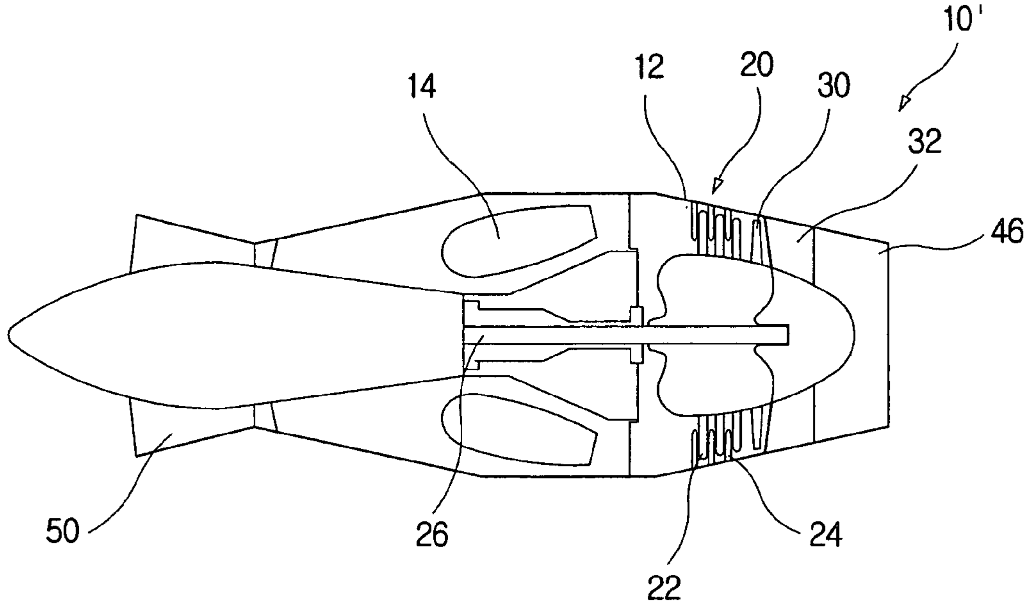
FIG. 6 is a sectional view showing another type of jet-propelled engine applying the principle of the present invention.

FIG. 6 shows that the principle of the present invention is applied to the ramjet engine. Referring to FIG. 6, the ramjet 10' generally uses no compressor since the ramjet 10' is generally used for a high-speed flight and the air flowing through an inhaling hole is compressed by itself. In that reason, a compressing chamber 50 for naturally compressing the inflow air by using a forward movement of the body 12 is installed at a front of the body 12.

The compressed air flowed through the compressing chamber 50 helps combustion of fuel in the burner 14, so rotating the turbine 20 installed at its rear. At this time, since the rotary shaft 26 of the turbine 20 is positioned at the center of the body 12, several burners 14 are dispersed near inner circumference of the body 12 around the rotary shaft 26.

The rotary shaft 26 of the turbine 20 is also combined with the fan 30 positioned at the rear of the turbine 20. Thus, when the exhaust gas passing through the burner 14 rotates the turbine 20, the fan 30 is also rotated together. In addition, since the fan 30 is operated to push the gas discharged through the turbine 20 rearward as described in the former embodiment, the ramjet engine of this embodiment also obtains a forwarding propulsive force by using the fan 30 in addition to the basic propulsive force. Furthermore, since the exhaust gas is ejected approximately straightly rearward due to geometric figure of the fan 30, the exhaust gas can also be utilized as a forwarding propulsive force without loss.

Generally, the jet engine is equipped with a cooling device in order to prevent the turbine or other parts from being seriously heated. In the present invention, it is also preferable to cool the fan 30 operating in the high-temperature exhaust gas. The cooling device can be a separate one additionally equipped in the jet engine or an existing cooling device modified as necessary.

This cooling device preferably may use the compressed air passing through the compressing chamber 50 though a separate coolant can be used. In addition, though not shown in the figure, as a cooling device, there can be installed a conduit directed connected from the compressing chamber 50 toward the fan 30 in order to supply the compressed air. At this time, the conduit may supply the compressed air to not only the fan 30 but also the rotors 22 and the stators 24 of the turbine for cooling. The conduit can be particularly designed to cool even bearings mounted in the turbine.

Figure 7:
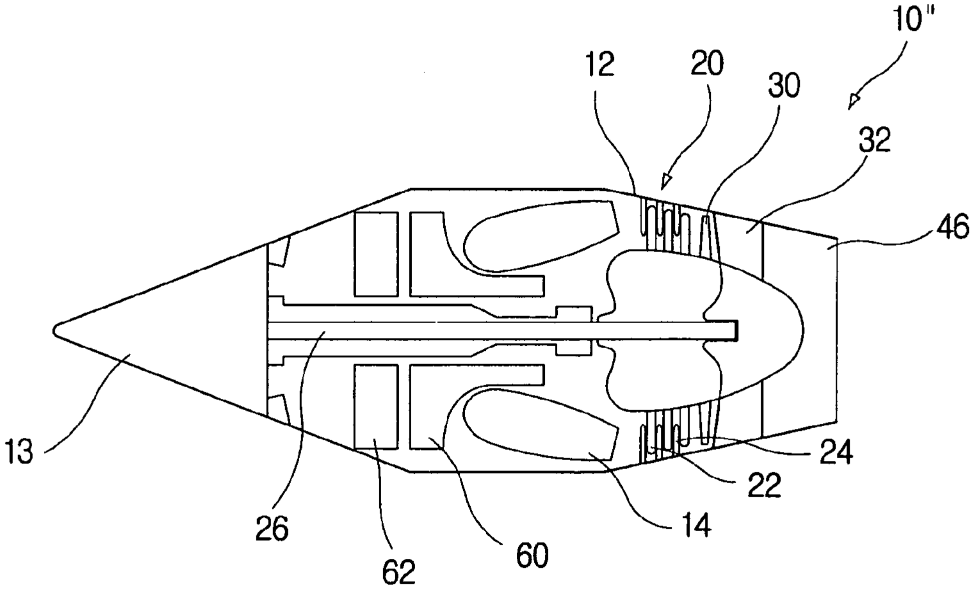
FIG. 7 is a sectional view showing still another type of jet-propelled engine applying the principle of the present invention.

FIG. 7 shows that the principle of the present invention is applied to a rocket. Referring to FIG. 7, a front portion of the body 12 of the rocket 10" is sealed. In the body 12, there are provided a fuel storage area 60 and an oxygen storage area 62 respectively containing fuel and oxygen to be supplied to the burner 14. The fuel storage area 60 and the oxygen storage area 62 can have various sizes and shapes according to usage and structural feature of the rocket, and not limited to any special case.

The fuel and oxygen can be stored in a liquid state in the fuel storage area 60 and the oxygen storage area 62, and flowed in the burner 14 through independent conduits. At this time, oxidizer for combustion of the fuel may be supplied into the burner 14 by rotating a screw-type pump with the use of the rotational force obtained through the turbine 20, or may be injected into the burner 14 by applying pressure to an oxidizer tank with the use of a separate pressure tank.

After flowed in the burner 14, oxygen and fuel are mixed and burned, and they are exhausted to rotate the turbine 20 installed at the rear of the burner 14. Since the turbine 20 is connected to the fan 30 mounted at the rear thereof through the same rotary shaft 26, the fan 30 rotates as the turbine 20 rotates. Thus, as described above, the fan 30 pushes the exhaust gas discharged from the turbine 20 rearward, so generating a forwarding propulsive force.

At this time, since the rotary shaft 26 is installed at the center of the body 12, which is a gyration center of the turbine 20 and the fan 30, the burner 14 is preferably dispersed around the rotary shaft 26, that is, near the inner circumference of the body 12.

In addition, a cooling device can also be equipped to cool the fan 30. Though the rocket of this embodiment cannot use compressed air, different to the former embodiments, the cooling device preferably uses coolant for cooling the fan 30. The cooling device can also supply the coolant to not only the fan 30 but also the rotors 22 and the stators 24 of the turbine, and the cooling device can be designed to cool even bearings mounted in the turbine.

INDUSTRIAL APPLICABILITY

The jet engine using exhaust gas according to the present invention configured as above has an advantage that it may minimize loss while the fan rotates since the fan produces a forwarding propulsive force within exhaust gas having high density rather than the atmosphere air having low density.

In addition, the jet engine of the present invention uses a fan having a diameter substantially similar to that of the last rotor of the turbine, instead of a large fan which has been used in the conventional turbofan or turboprop engines. So, the jet engine of the present invention gives advantages that a weight of the fan is reduced and resistance of the airplane caused by air friction can be dramatically reduced since a front surface of the engine is decreased.

Furthermore, the present invention may produce an additional forwarding propulsive force by deforming tails of the rotors to be directed rearward as another embodiment.

Additionally, this principle can be applied to ramjet and rocket, and they can also obtain a propulsive force by means of the fan rotating among exhaust gas as well as a repulsive force generated by ejection of the exhaust gas. This is helpful in increase of speed and fuel saving since efficiency of the engine is improved.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A jet engine comprising:
a body;
a burner installed in the body to inject and burn fuel in compressed air;
a high-pressure turbine having a plurality of rotors, the high-pressure turbine being rotated by high-pressure exhaust gas discharged from the burner;
a low-pressure turbine having a plurality of rotors, the low-temperature turbine being rotated by low-pressure exhaust gas passing through the high-pressure turbine;
a rotary shaft combined to gyratory centers of the high-pressure turbine and the low-pressure turbine; and
a fan combined with the rotary shaft at the rear of a last rotor of the low-pressure turbine to rotate together with the rotary shaft in order to provide propulsive force in the exhaust gas, discharged through the low-pressure turbine from the burner,
wherein the fan is substantially parallel to a tail portion of the last rotor of the low-pressure turbine at a head portion thereof and curved rearwardly at a tail portion thereof in order to change the lateral component of velocity of the exhaust gas, passing through the low-pressure turbine, to be directed in an axial direction to the utmost when rotating.

2. A jet engine according to claim 1,
wherein a bent portion is formed in a tail of each rotor of the low-pressure turbine except the last rotor so as to change the lateral component of velocity of the exhaust gas, passing through another rotor positioned upsteam, to be directed in the axial direction to the utmost so as to provide propulsive force.

3. A jet engine according to claim 1,
wherein each rotor of the low-pressure turbine except the last rotor has first and second tails,
the first tail being formed substantially straight so that gas flowing on a surface thereof is directed toward an adjacent rotor, the second tail being bent rearward so that the lateral component of velocity of the exhaust gas, advancing from another adjacent rotor, is directed in the axial direction to the utmost so as to provide propulsive force.

4. A jet engine according to claim 1,
wherein each rotor of the low-pressure turbine except the last rotor has a tail transformed to have first and second surfaces
the first surface being formed substantially straight so that gas flowing on a surface thereof is directed toward an adjacent rotor, the second surface being bent rearward so that the lateral component of velocity of the exhaust gas, advancing from another adjacent rotor, is directed in the axial direction to the utmost so as to provide propulsive force.

5. A jet engine according to claim 1,
wherein the fan has a diameter substantially similar to a diameter of the last rotor of the low-pressure turbine.

* * * * *